United States Patent [19]
Diem et al.

[11] Patent Number: 5,711,568
[45] Date of Patent: Jan. 27, 1998

[54] RETRACTABLE CARGO COVER

[76] Inventors: D.W. Diem, 180 Newport Center Dr., #180, Newport Beach, Calif. 92660; Roberto Anama, 26 Mesa Ridge Dr., Pomona, Calif. 91766

[21] Appl. No.: 596,939

[22] Filed: Feb. 5, 1996

[51] Int. Cl.⁶ ................................................ B60R 5/04
[52] U.S. Cl. .................... 296/37.16; 160/23.1; 160/24; 160/25; 160/88; 160/122; 160/313; 160/316; 160/323.1; 267/155
[58] Field of Search .............. 296/24.1, 37.16; 160/23.1, 24, 25, 88, 120, 121.1, 122, 238, 313, 315, 316, 317, 318, 323.1, 324, 325, 326; 242/371, 372; 267/154, 155, 166, 69

[56] References Cited

U.S. PATENT DOCUMENTS 4,202,577  5/1980  Breitschwerdt et al. .......... 296/37.16 X
4,277,097  7/1981  Lalanne ........................... 296/37.16

FOREIGN PATENT DOCUMENTS 258823  3/1988  European Pat. Off. .......... 296/37.16

*Primary Examiner*—Andrew C. Pike
*Attorney, Agent, or Firm*—Price, Gess & Ubell

[57] ABSTRACT

A retractable cover for a vehicle cargo area includes a roller containing a bungee cord, operative as a retraction mechanism. The covers are fabricated of an opaque cloth or vinyl material, or a transparent or screen material. The covers may be deployed longitudinally across the cargo area, or vertically towards the top of the vehicle. A housing may enclose multiple rollers and provide openings to deploy the covers. The retractable cover is simple and inexpensive, and provides multiple capabilities for varying users' needs.

5 Claims, 5 Drawing Sheets

FIG. I

RETRACTABLE CARGO COVER

BACKGROUND OF THE INVENTION

1. Field of the Invention

The present invention relates generally to a cover for visible cargo spaces in the rear of a motor vehicle and, more particularly, to a cover on a retractable roller with multiple deployment options.

2. Description of Prior Art

In many types of motor vehicles and, in particular, utility vehicles such as sports vans, sports wagons, and station wagons, it is known to provide a cargo area which is located in the passenger compartment of the vehicle immediately behind the rear seat. A rear hatch or rear cargo door is typically used to provide access to the cargo area. In certain vehicles, the seat back of the rear seat may be folded forward, or the rear seat completely removed from within the vehicle, to increase the size of the cargo area.

Significant problems arise, however, when storing cargo within the cargo area. It is visible to anyone who looks through the vehicle windows, particularly the window included in the rear hatchback door. As will be recognized, the fact that the cargo is visible adds to or creates the temptation for persons to break into the vehicle and steal such cargo, particularly if it is apparent that the cargo is relatively costly or valuable. In addition, cargo stored in the cargo area is susceptible to becoming airborne, flying towards the front of the vehicle during a sudden stop. The movement of cargo forward into the passenger area may itself cause injury, or it may present a danger by distracting the driver.

In recognition of the problems associated with cargo loosely stored within the cargo area and in plain view, it has become a common practice for those vehicles which include a cargo area to be provided with a flexible or rigid plastic cover which is suspended above the cargo area floor, and used to restrain the cargo and conceal from sight the contents of the cargo area. The flexible covers known in the prior art are typically provided in the form of a flexible sheet of opaque material (such as cloth or vinyl) which is mounted to a retractable roller. The roller is typically mounted on the back of the rear seat, with the flexible sheet being selectively extendable over the cargo area and into releasable attachment to a portion of the vehicle body behind the rear seat. The roller typically operates like a common window shade, the roller containing a torsional spring operative as a retraction mechanism.

Although the devices of the prior art have proven generally suitable for their intended purposes, they possess inherent deficiencies which detract from their overall effectiveness and desirability. The devices with rollers containing the torsional springs are more costly, difficult to assemble, and heavier than necessary. Additionally, the torsional springs are subject to mechanical problems during the life of the device. Finally, the prior art devices do not provide multiple capabilities to satisfy users' varied needs.

OBJECTS AND SUMMARY OF THE INVENTION

In view of the shortcomings of the prior art, it is the object of the present invention to provide an improvement over conventional retraction mechanisms. It is a further object to provide a retractable cargo cover that will satisfy multiple needs of various users.

The present invention specifically addresses the above-mentioned objectives and alleviates the above-mentioned deficiencies associated with the prior art. Generally, the present invention includes a roller with a bungee cord retraction mechanism. The present invention may further include a plurality of covers and deployment options.

More particularly, the preferred embodiment of the present invention includes a flexible opaque cover wound around the roller. One end of the opaque cover is anchored to the roller and the other end is deployable in a longitudinal direction to unwind the cover across the vehicle cargo area.

An alternate embodiment of the present invention includes a flexible cover made of a transparent material or a transparent screen material, deployable in a vertical direction to unwind the cover towards the top of the vehicle cargo area. This deployment could be used to restrain small household pets or packages in the vehicle cargo area. In another embodiment both an opaque cover and a transparent screen cover are enclosed in a housing, with openings to provide for deployment.

The present invention provides an economical roller retraction mechanism with fewer inherent mechanical problems. The present invention further provides dual-purpose capability to conceal cargo in the lower half of the vehicle cargo area and, alternatively, to restrain cargo in the vehicle cargo area.

These, as well as other advantages of the present invention, will become more apparent from the following description and drawings. It is understood that changes in the specific structure shown and described may be made within the scope of the claims without departing from the spirit of the invention.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

Figure 1:
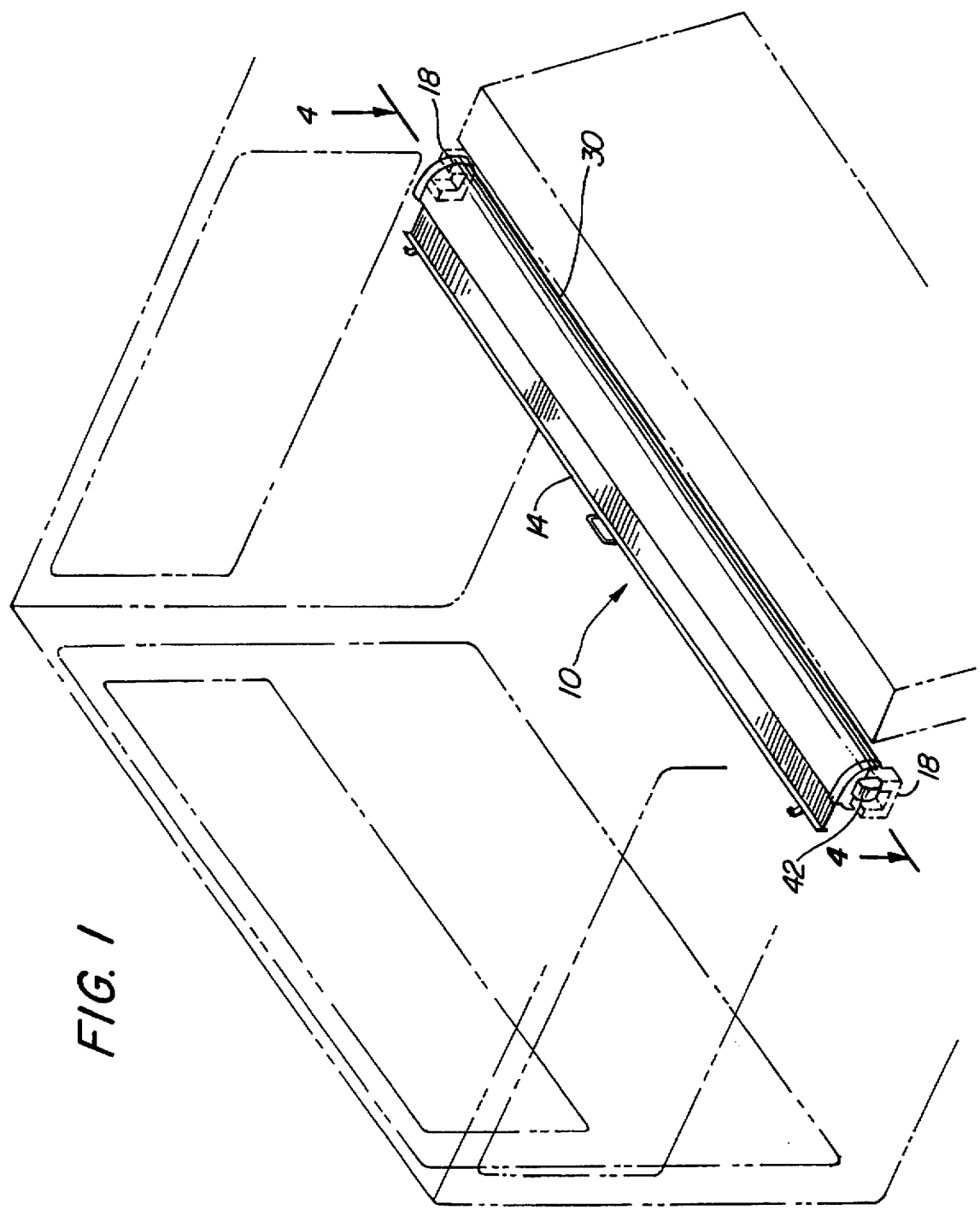
FIG. 1 is a perspective view of the vehicle cargo area, showing the retractable cover of the present invention mounted therein.
Figure 2:
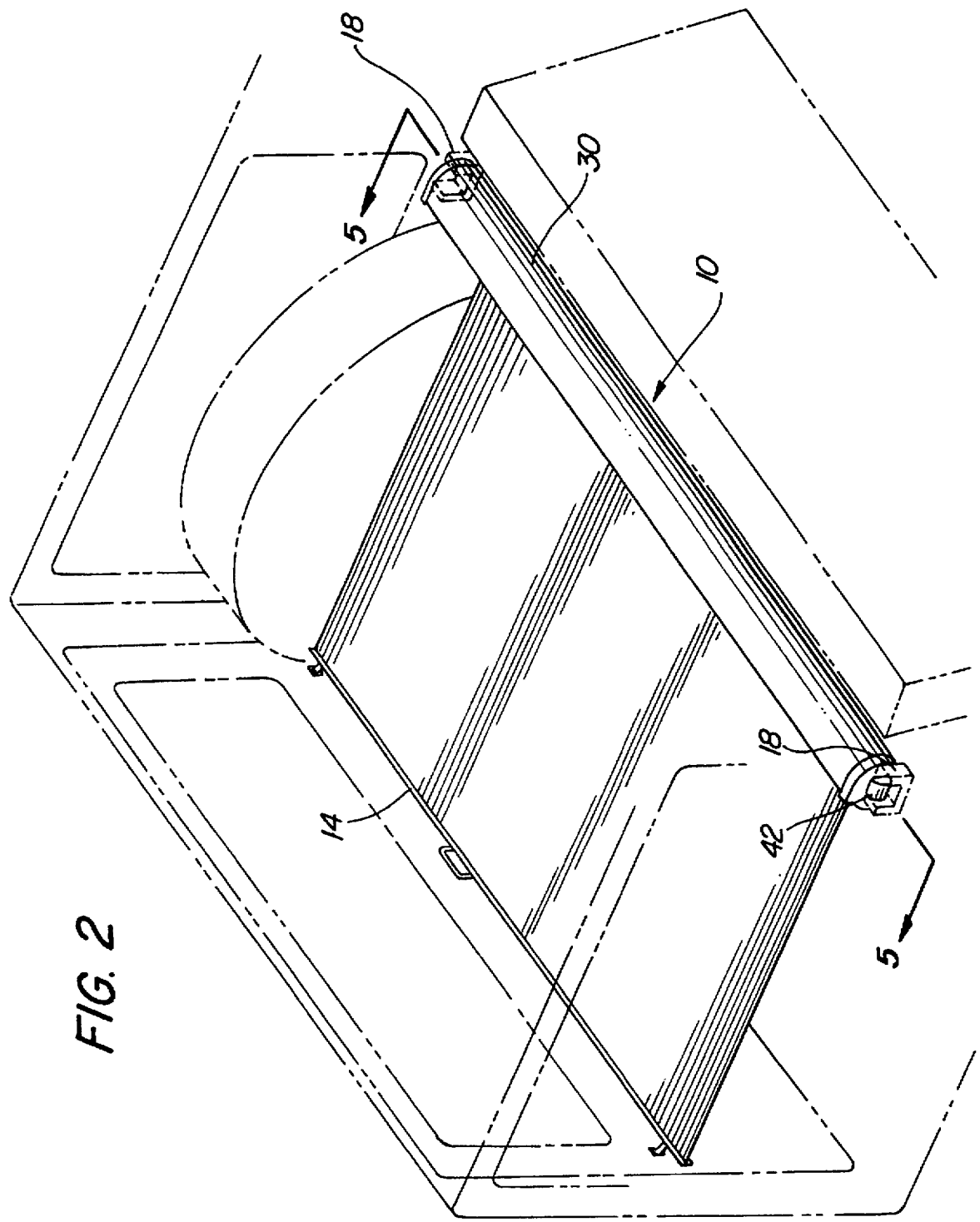
FIG. 2 is a perspective view showing the retractable cover deployed across the cargo area.
Figure 3:
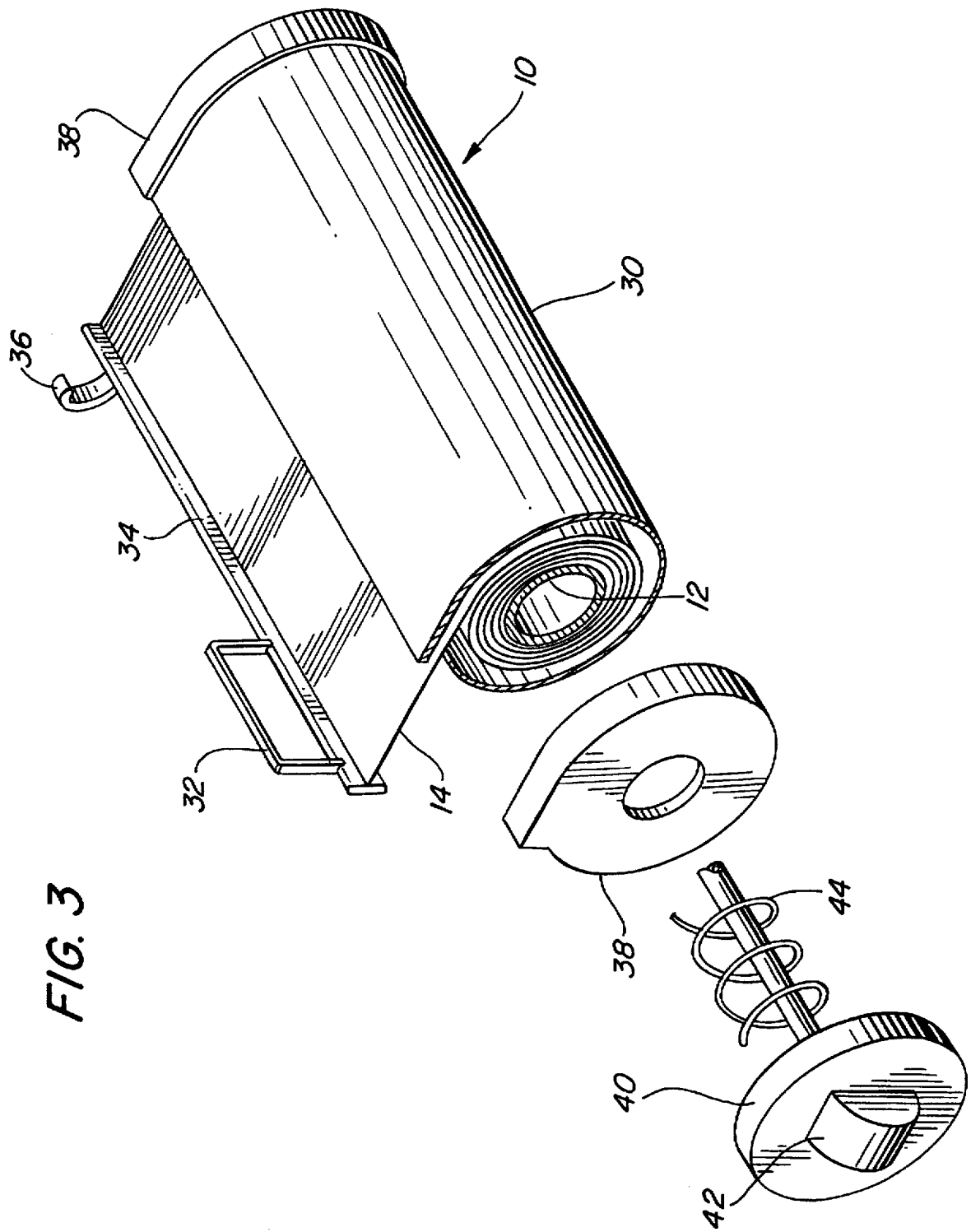
FIG. 3 is a detailed perspective view showing the parts of the retractable cover.

The detailed discussion set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The retractable cargo cover 10 of the present invention is illustrated in FIGS. 1 through 6, which depict presently preferred embodiments of the invention. Referring now to FIGS. 1 through 3, the retractable cargo cover 10 is generally comprised of a roller 12 in the shape of an elongate hollow cylinder with a pair of ends. The roller 12 is preferably fabricated from a rigid yet lightweight material, such as hard plastic or cardboard. The retractable cargo cover 10 further includes a flexible opaque cover 14, of a generally square shape, that may be wound around the outside of the roller 12, with one edge of the opaque cover 14 attached to the roller 12. The opaque cover 14 is preferably fabricated of vinyl or cloth material.

Figure 4:
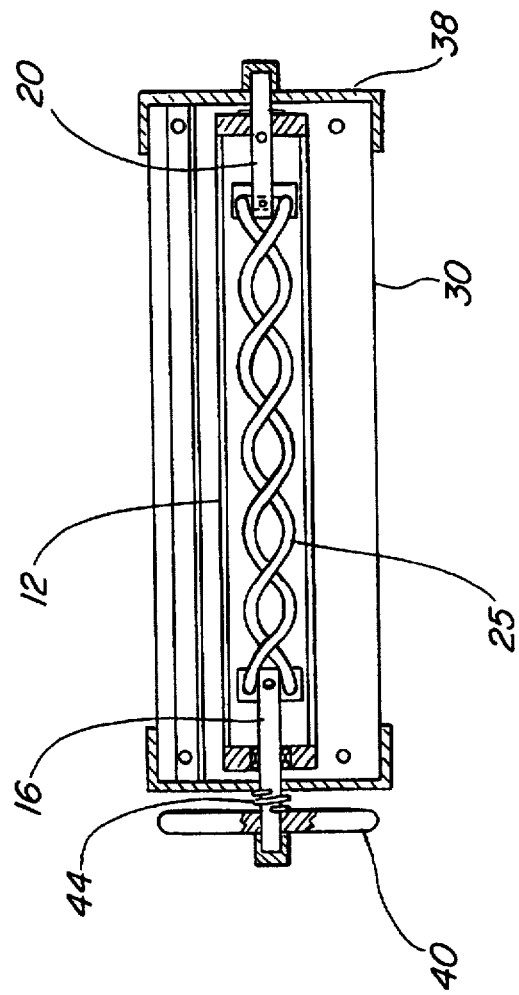
FIG. 4 is a cross-sectional view of the roller depicted by line 4—4 of FIG. 1 with the bungee cord retraction mechanism.
Figure 5:
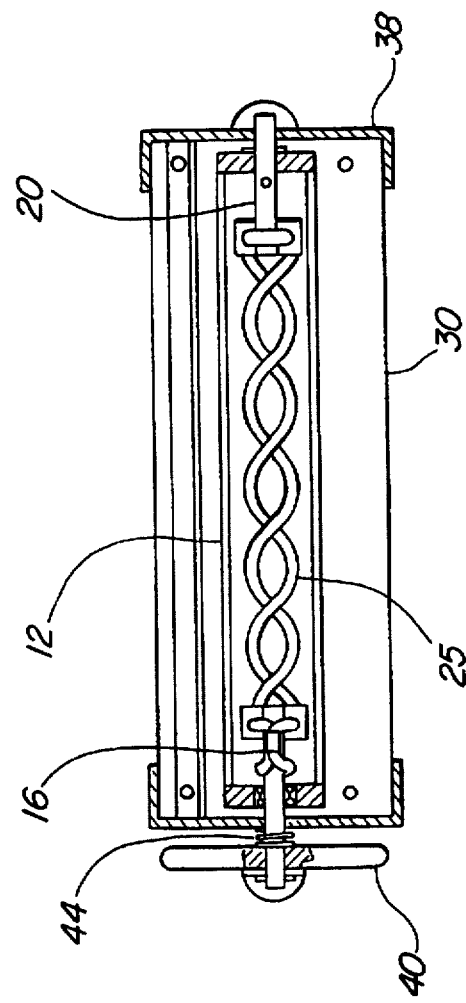
FIG. 5 is a cross-sectional view of the roller depicted by line 5—5 of FIG. 2 with the bungee cord retraction mechanism.

Now also referring to FIGS. 4 and 5, the structural and mechanical detail of the roller 12 and its mounting to the vehicle cargo area will be described. At one end of the roller 12 is a fixed rod 16 that is fixedly connected to an external bracket 18 that is attached to the vehicle cargo area. The fixed rod 16 is connected to the roller 12 such that the roller 12 is free to rotate about the fixed rod 16. At the opposite end of the roller 12 is a rotating rod 20. The rotating rod 20 is rotatably connected to a second external bracket 18, which is attached to the vehicle cargo area. The rotating rod 20 is connected to the roller 12 in a manner such that the rotating rod 20 rotates with the roller 12 as the cover 14 is wound or unwound. Inside the roller 12 is a bungee cord 25 that is formed into a helical spring and fixedly connected to the free ends of the fixed rod 16 and the rotating rod 20. The bungee cord 25 is preferably fabricated of an elastic polyester material.

Now referring to FIG. 3, the roller 12 and the cover 14 of the preferred embodiment are installed in a housing 30. For purposes of unwinding the cover 14 from the roller 12, the cover includes a handle 32, a free end 34, and one or more hooks 36 built into the free end 34 of the cover 14. The housing 30 has a pair of ends 38. The handle 32, the edge 34, and the hooks 36, as well as the housing 30, are all preferably fabricated from a hard plastic material. Attached to the outboard end of the fixed rod 16 is an installation pad 40. Both ends of the housing 30 have rachet pawls 42 sized to be accepted by the external brackets 18. Disposed along the fixed rod 16 between the housing end 38 and the installation pad 40 is a conventional coiled spring 44. The coiled spring 44 is sized such that applying a compression force to the installation pad 40 and the spring 44 allows the rachet pawl 42 to be engaged in the external bracket 18.

Figure 6:
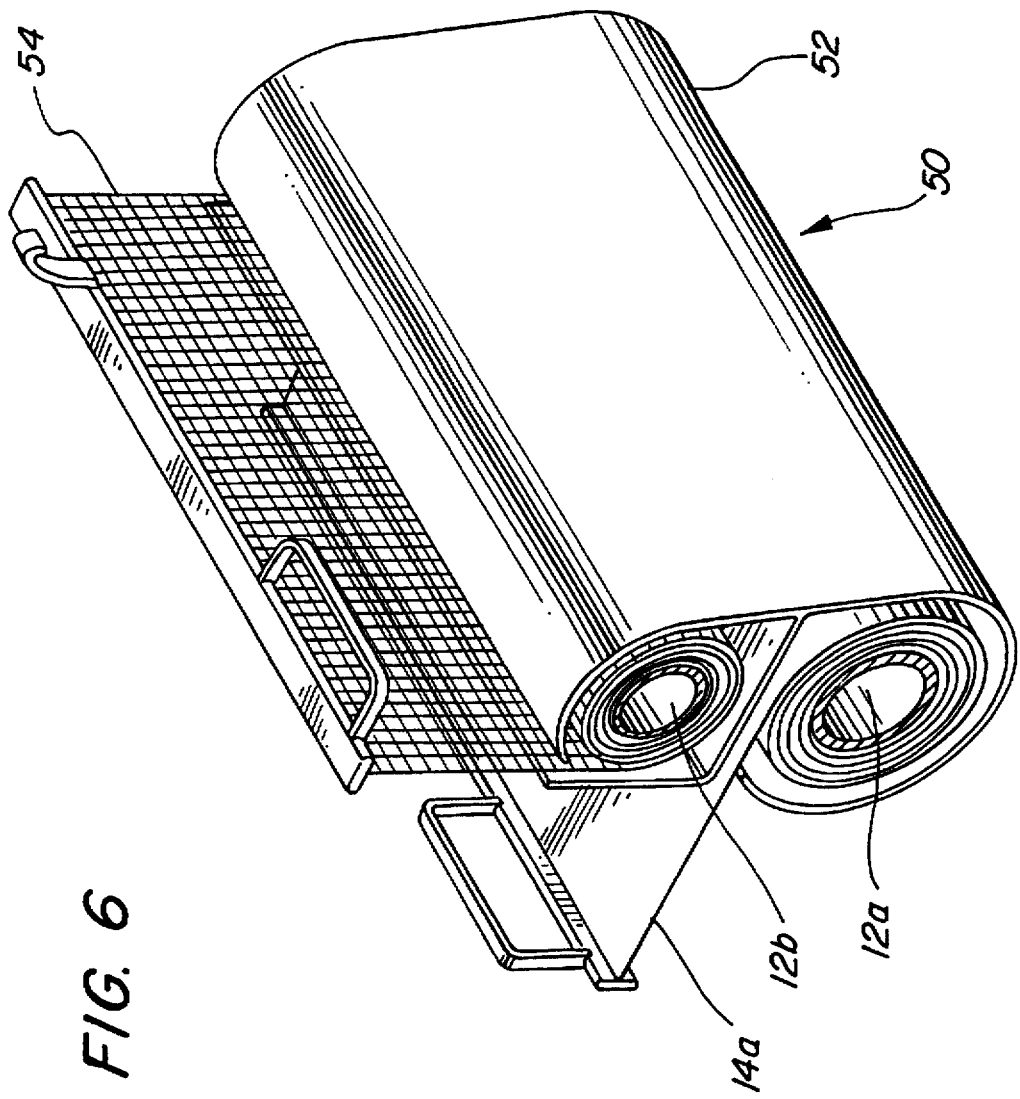
FIG. 6 is a perspective view of the alternate embodiment present invention, the vertically deployable screen.

Now referring to FIG. 6, an alternative embodiment of the present invention will be described. The alternate retractable cargo cover 50 is generally comprised of an enlarged housing 52 (shown with the ends removed) that encloses two rollers 12a,b of the preferred embodiment. The roller 12a mounted below has the opaque cover 14 of the preferred embodiment, while the roller 12b mounted above has attached thereto a transparent screen cover 54, preferably fabricated from a transparent screen material. Openings in the alternate embodiment housing 50 provide for longitudinal deployment of the opaque cover 14a and vertical deployment of the transparent screen cover 54. The alternate embodiment 50 could be configured to provide for vertical deployment of the opaque vinyl cover 14a or longitudinal deployment of the screen cover 54.

The exemplary retractable cargo covers described herein and shown in the drawings represent only presently preferred embodiments of the invention, and the descriptions have been provided for ease of understanding only. Various modifications and additions may be made to the embodiments without departing from the spirit and scope of the invention. By way of example only, the retractable cargo cover 10 of the present invention could be attached to the vehicle across the rear sidewall, rather than to the passenger seat. The opaque cover 14 could then be deployed in a forward direction towards the passenger seat. The transparent screen cover 54 could be deployed in a vertical direction along the rear sidewall of the vehicle. These and other modifications and additions may be obvious to those skilled in the art and may be implemented to adapt the present invention for use in a variety of different applications.

What is claimed is:

1. A retractable cover for a cargo area of a vehicle defined by three side walls and a passenger seat, the retractable cover including:

a roller formed from an elongate hollow cylinder, said roller having first and second ends;

a flexible cover being wound around an exterior surface of the roller, a first end of the flexible cover being anchored to the roller, a second end of the flexible cover being deployable in a longitudinal direction to unwind the flexible cover across the cargo area;

a fixed rod having first and second ends, said first end of said fixed rod being fixedly connected to the vehicle at approximately a height of a top of the passenger seat, said first end of the roller being rotatably connected to a middle portion of the fixed rod;

a rotating rod having first and second ends, said first end of said rotating rod being rotatably connected to the vehicle at approximately the height of the top of the passenger seat, the second end of the roller being fixedly connected to the middle portion of the rotating rod; and a bungee cord disposed inside the roller, the bungee cord being fixedly connected to the second ends of the fixed and rotating rods.

2. The retractable cover of claim 1, wherein the flexible cover is fabricated of an opaque material.

3. A retractable cover for a cargo area of a vehicle defined by three side walls and a passenger seat, the retractable cover including:

a roller formed from an elongate hollow cylinder, said roller having first and second ends;

a flexible cover being wound around an exterior surface of the roller, a first end of the flexible cover being anchored to the roller, a second end of the flexible cover being deployable in a vertical direction;

a fixed rod having first and second ends, said first end of said fixed rod being fixedly connected to the vehicle at approximately a height of a top of the passenger seat, said first end of the roller being rotatably connected to a middle portion of the fixed rod;

a rotating rod having first and second ends, said first end of said rotating rod being rotatably connected to the vehicle at approximately the height of the top of the passenger seat, the second end of the roller being fixedly connected to the middle portion of the rotating rod; and a bungee cord disposed inside the roller, the bungee cord being fixedly connected to the second ends of the fixed and rotating rods.

4. The retractable cover of claim 3, wherein the flexible cover is fabricated of a transparent material.

5. The retractable cover of claim 3, wherein the flexible cover is fabricated of a screen material.

* * * * *